Feb. 18, 1947.  J. W. ELDRED  2,415,997
ARTICLE HANDLING APPARATUS
Filed Jan. 12, 1946  10 Sheets-Sheet 1

INVENTOR.
John W. Eldred
BY
*Cubitt, Mahoney + Miller*
ATTORNEYS

INVENTOR.
John W. Eldred.
BY
Corbett, Mahoney + Miller
ATTORNEYS

Feb. 18, 1947.　　J. W. ELDRED　　2,415,997
ARTICLE HANDLING APPARATUS
Filed Jan. 12, 1946　　10 Sheets-Sheet 4
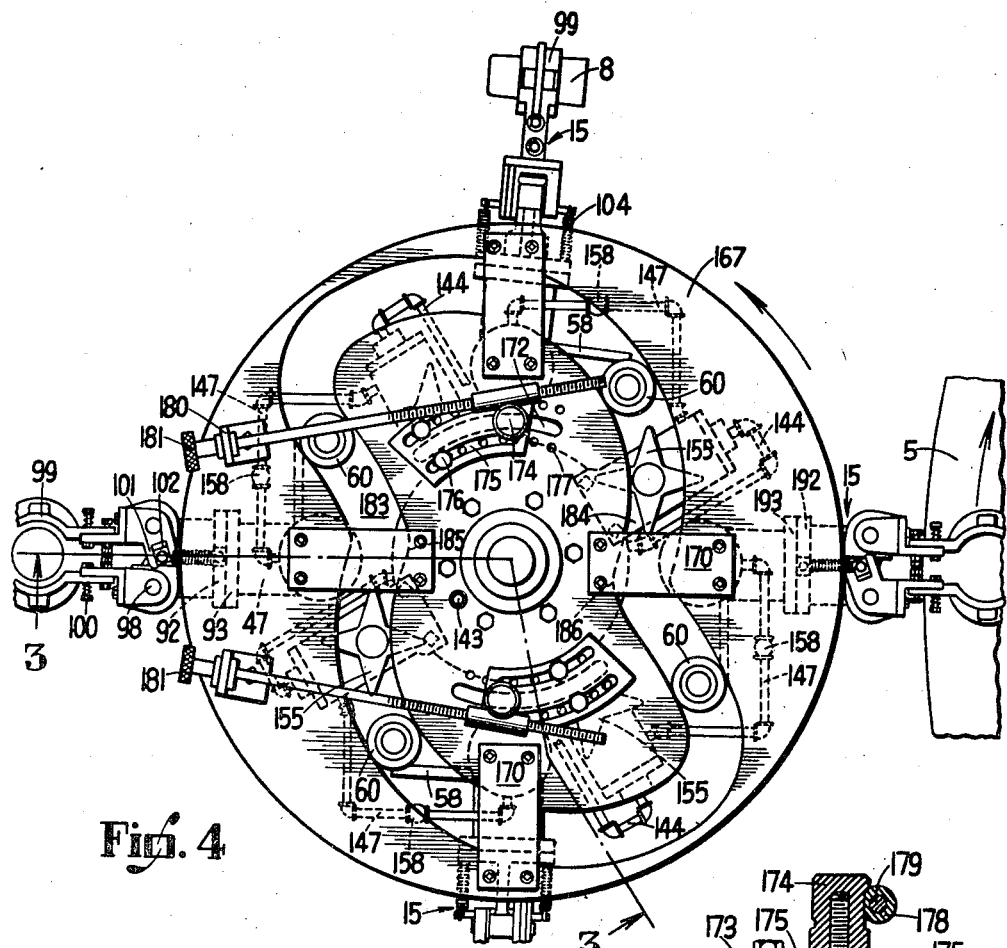
Fig. 4
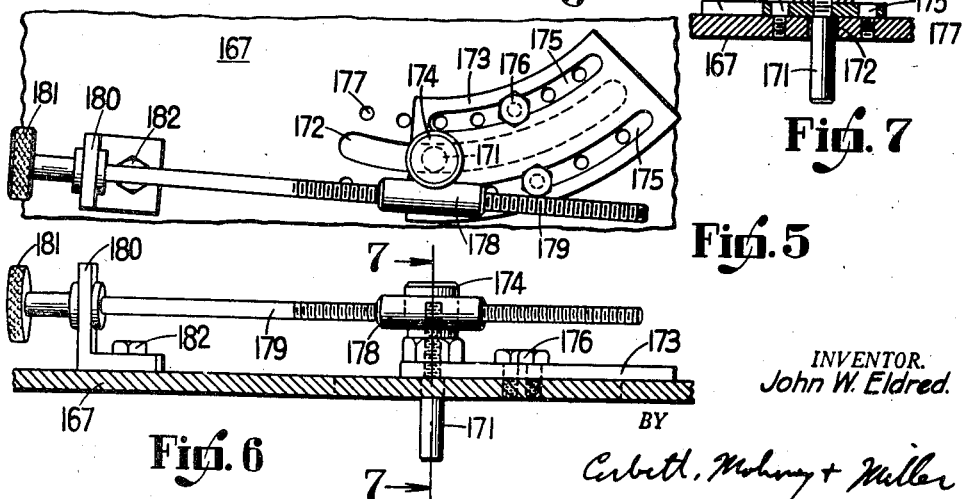
Fig. 7
Fig. 5
Fig. 6
INVENTOR.
John W. Eldred.
BY
Corbett, Mahony + Miller
ATTORNEYS

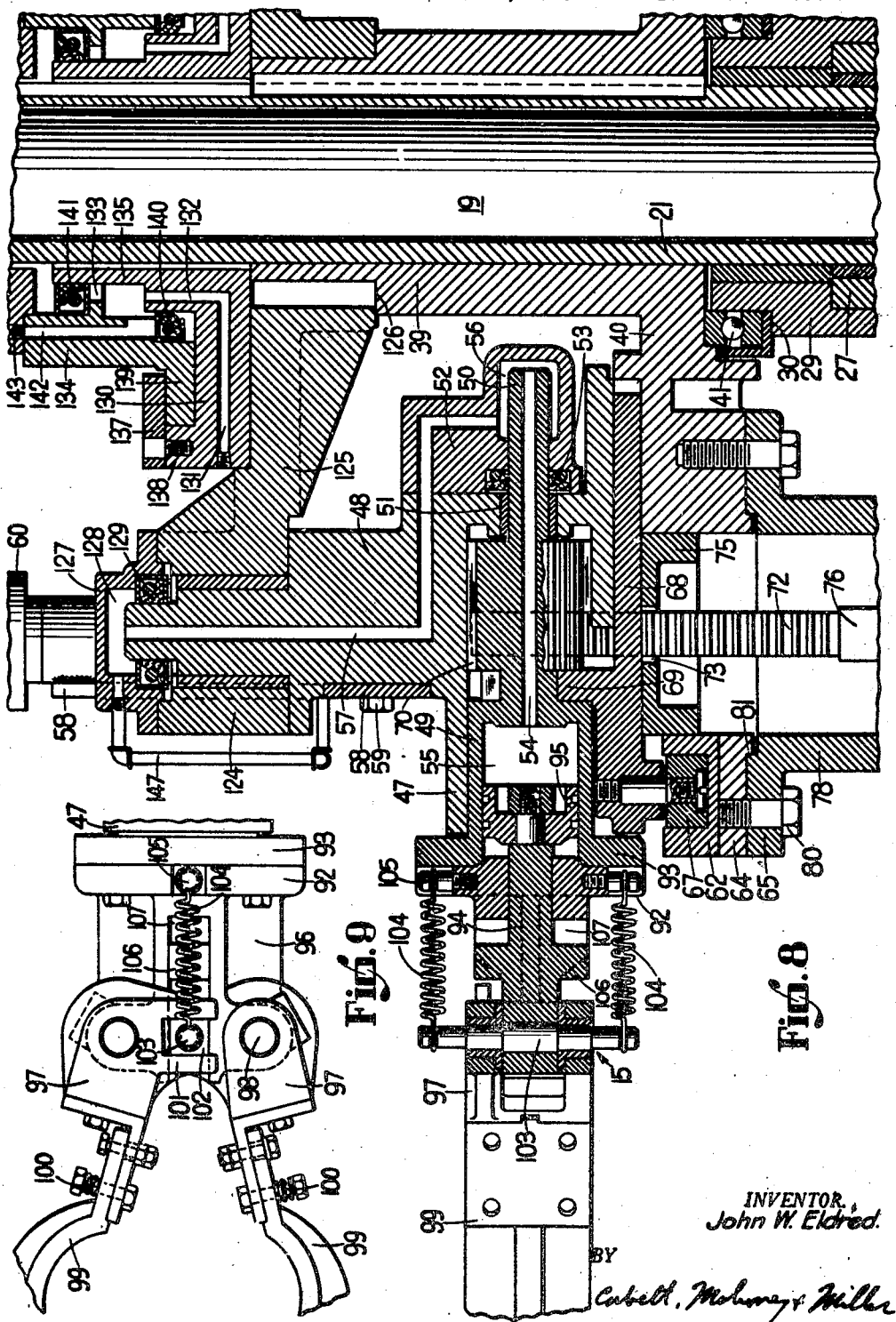

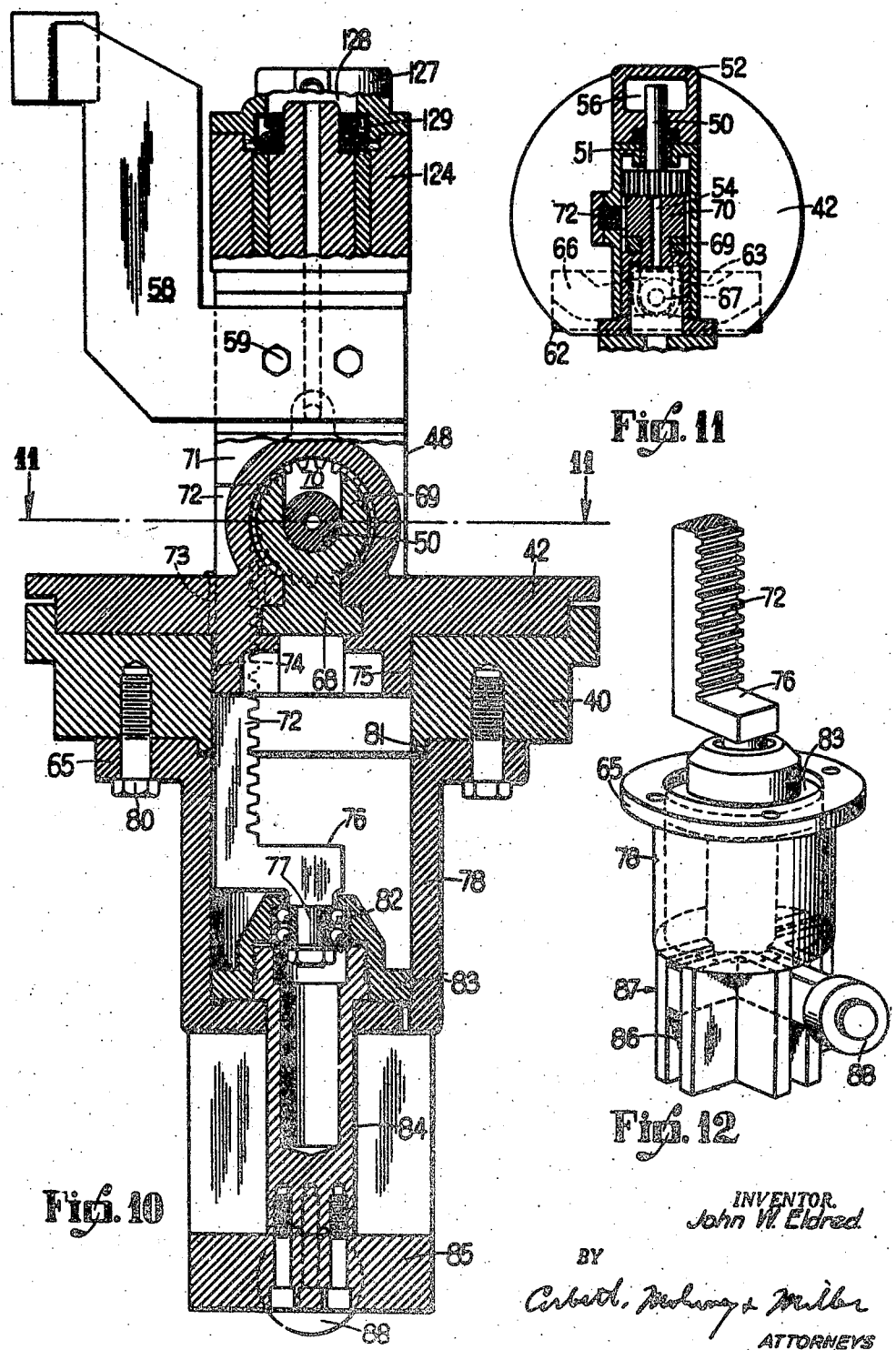

Feb. 18, 1947.   J. W. ELDRED   2,415,997
ARTICLE HANDLING APPARATUS
Filed Jan. 12, 1946    10 Sheets-Sheet 10

INVENTOR.
John W. Eldred.
BY
ATTORNEYS

Patented Feb. 18, 1947

2,415,997

UNITED STATES PATENT OFFICE 2,415,997

ARTICLE HANDLING APPARATUS

John W. Eldred, Columbus, Ohio

Application January 12, 1946, Serial No. 640,969

14 Claims. (Cl. 214—1)

My invention relates to article handling apparatus. It has to do, more particularly, with apparatus for handling glassware. It is especially useful for removing glassware from automatic glass forming machines and transferring the ware to a moving conveyer or some other support remote from the forming machine, although it is not limited thereto.

Various types of transferring machines are used in glass plants and have greatly reduced the manual handling of the ware. Usually in association with an automatic forming machine of the intermittent type, there is provided a transferring machine of the Geneva drive or intermittent type which is synchronized with the intermittent forming machine. In fact, the transferring machine is usually driven from the same source of power that is employed for driving the forming machine. Due to the constant stopping and starting, with an intermittently operating transferring machine power failures are frequent and the machine is frequently in need of repairs and replacement parts. Also, due to the intermittent operation, a more complicated transferring machine has been necessary to obtain the desired capacity. Because of the fragile nature of glassware, especially after removal from a forming machine and before annealing, a great deal of breakage occurs with the intermittent type of transferring machine, due to jerking and vibration caused by the intermittent operation. Also, since the ware is still hot when removed from the forming machine, there is danger of deformation or distortion of the ware by the jerking and vibration of the intermittently operating transferring machine. Furthermore, it is difficult to time the operation of the intermittently operating transferring machine with the forming machine and with a movable conveyer to which the ware is to be transferred. In setting the ware on a conveyer which is intermittently movable, it is necessary that the timing be substantially perfect in order to keep the ware from tumbling over. Also, if the conveyer is continuously moving there is danger of tipping the ware. For many years, there has been a need in the glass industry for a continuously operating transferring machine which would be satisfactory for removing ware from an intermittently operating forming machine and for placing it on a moving conveyer or stationary supporting surface.

One of the objects of my invention is to provide a continuously operating article transferring machine which will be exceptionally smooth in operation and will, therefore, handle the glassware with a minimum of breakage or distortion of the ware.

Another object of my invention is to provide a continuously operating transferring machine which is especially useful in combination with an intermittent forming machine for transferring ware from such machine to a moving conveyer or stationary support remote from the forming machine.

Another object of my invention is to provide a continuously operating transferring machine which may be of a light and compact construction due to its smooth operating nature and though of simple construction will have a greatly increased capacity over prior art machines of the intermittent type.

Another object of my invention is to provide a continuously operating transferring machine which will remove ware from a forming machine and deposit it on a supporting surface of a moving conveyer or a stationary support in such a manner that there will be no danger of the ware toppling over on such surface.

Another object of my invention is to provide a continuously operating transferring machine which will remove ware from a forming machine and will place it on spindles or in cups, with or without first inverting it, which are carried by a moving conveyer, the transferring machine being so timed with the conveyer that there will be no danger of the ware missing the cups or spindles or being deposited improperly thereon.

Another object of my invention is to provide a transferring machine which, though being continuous in operation, has certain advantages possessed by an intermittent machine due to the fact that the article-handling units thereof have "dwell" periods at the takeout and discharge positions of the machine.

Various other objects will be apparent as the description of this machine progresses.

In its preferred form, my invention contemplates the provision of a transferring machine which is of a continuously rotating turret-type. This machine, for example, may be positioned between a forming machine of the intermittently rotating mold table type and a continuously moving conveyer. The conveyer may either be of a type which has a flat ware supporting surface, a type embodying a plurality of article receiving spindles upon which inverted articles are placed, a type including a plurality of article receiving cups, or of other types. These conveyers may be associated with a leer loader, a glazer, a burnoff machine, or other forms of machines used in the manufacture of glassware. My transferring machine will automatically pick up the ware from the forming machine and transfer it to the continuously moving conveyer, with or without first inverting it. However, my machine is also capable of transferring the ware to a stationary supporting surface.

My machine consists mainly of a continuously rotating turret which carries a plurality of radially extending, circumferentially spaced article handling units. Each of these units includes tongs which are adapted to grip the article. Each of these units may have mechanism associated therewith for inverting the ware, during rotation of the turret, after it has been lifted from the forming machine and before it has been deposited on the conveyer. Mechanism is provided for moving the article handling units vertically on the turret during the continuous rotation of the turret, so that they will remove the articles at one level from the forming machine and deposit them at another level on the conveyer. The radially extending article handling units are mounted on the turret for swinging movement and limited radial extension in a horizontal plane. Means are provided, in association with the turret, for controlling the swinging and limited radial extension movement of each article handling unit during rotation of the turret. This means provides for a "dwell" period at the time the tongs of each unit move into association with the article on the forming machine to grip it and at the time such tongs move into association with the conveyer to release the article. The limited radial extension of each unit during rotation of the turret causes the article engaging tongs thereof to travel along a true circle at all times.

Thus, although the turret moves continuously, it will operate properly with an intermittently operating forming machine and with a continuously moving straight-line conveyer without breakage, distortion or toppling of the ware due to the provision of the "dwell" periods at the article engaging and discharging points. It will also function with an intermittently moving conveyer or a stationary article receiving support. With the continuous movement of the turret, power breakdowns are less frequent and wear and tear on the machine is substantially lessened since the machine is not subjected to the constant hammering, jerking and vibration caused by the continual starting and stopping of the intermittent type machine. Thus, I am able to construct a lighter and more compact machine due to the fact that the smooth continuous operation eliminates the necessity of providing a more rugged and heavy construction.

The preferred embodiment of my invention is illustrated in the accompanying drawings wherein similar characters of reference designate corresponding parts and wherein:

Figure 4 is a top plan view of the transferring machine.

Figure 5 is a fragmentary top plan view of mechanism for adjusting one of the triggers which controls supply of air to the tongs of each article handling unit or operation of such tongs.

Figure 6 is a side elevational view of the mechanism shown in Figure 5.

Figure 7 is a transverse sectional view taken substantially along line 7—7 of Figure 6.

Figure 8 is an enlarged sectional view through the upper portion of the turret and one of the article handling units and illustrating in detail the air supply system for such unit.

Figure 9 is a fragmentary top plan view of a portion of one of the article handling units illustrating the tongs thereof.

Figure 10 is a vertical sectional view taken along line 10—10 of Figure 3 and showing the ware-inverting mechanism.

Figure 11 is a transverse sectional view taken substantially along line 11—11 of Figure 10.

Figure 12 is a perspective view of a portion of the ware-inverting mechanism.

Figure 2:
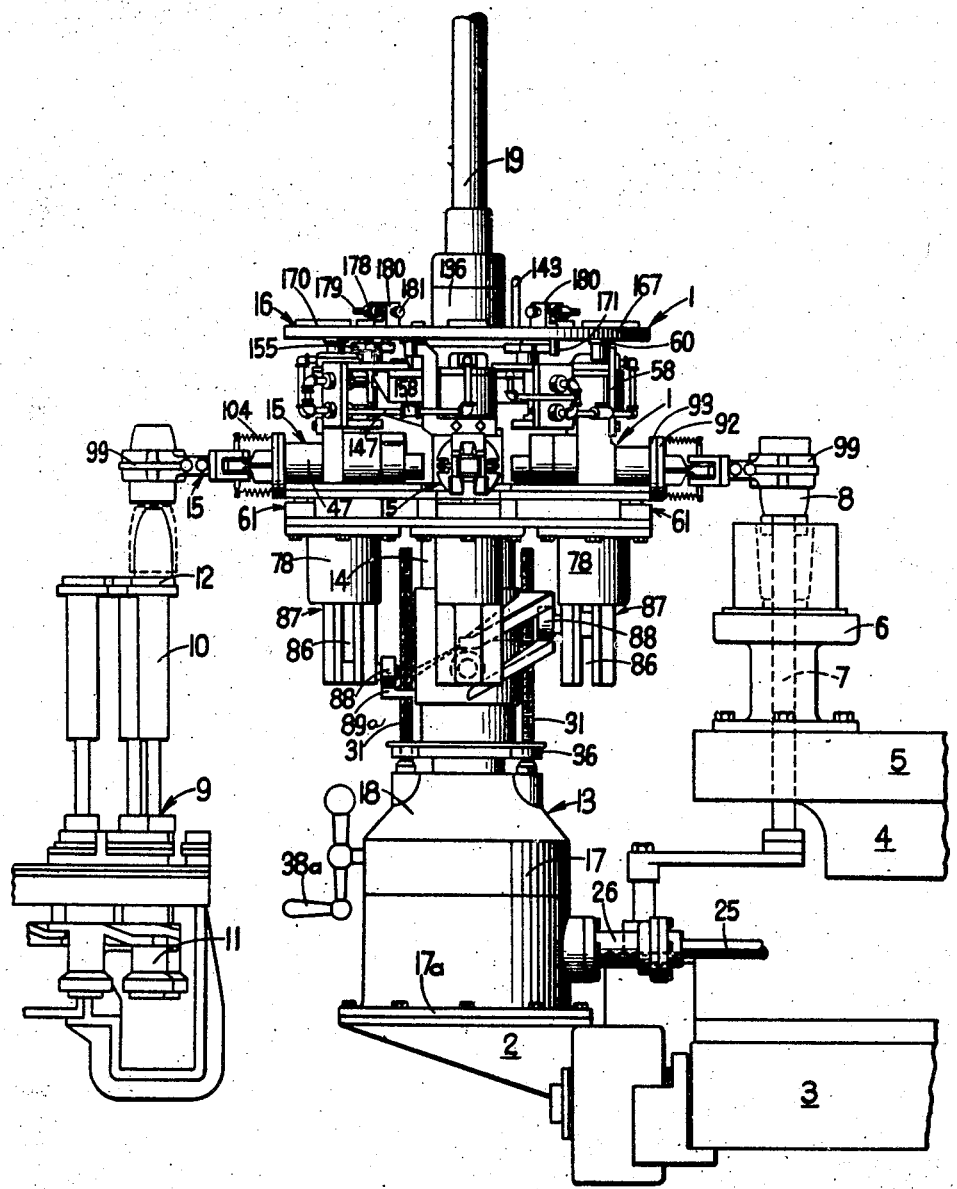
Figure 2 is a side elevational view of my transferring machine showing it disposed between a mold table of the forming machine and a conveyer for receiving the articles in inverted position.
Figures 3, 3A:
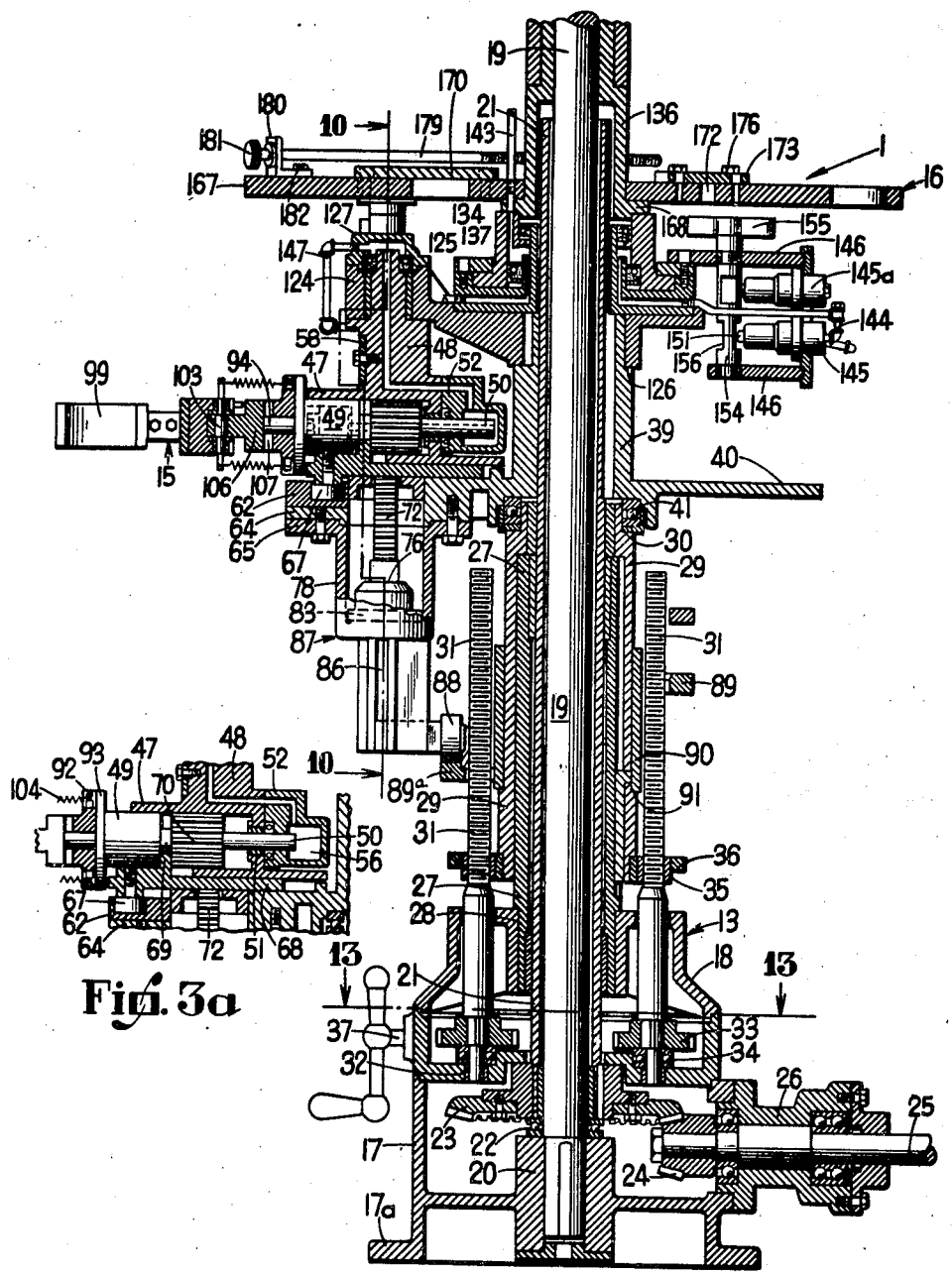
Figure 3 is a vertical sectional view taken through the machine substantially along line 3—3 of Figure 4.
Figure 3a is a fragmentary detail in section of a portion of one of the article handling units.

With reference to the drawings I have illustrated my glass transferring machine generally by the reference character 1 in Figure 2. This machine is carried on an extension 2 of the base 3 of a forming machine indicated generally by the numeral 4. The forming machine 4 may be of the intermittently operating type and includes an intermittently rotatable mold table 5 which supports a plurality of circumferentially spaced mold units 6. The usual valve arrangement 7 is provided on this forming machine for lifting the article 8 above the upper edge of the mold into the takeout position, as shown in Figure 2. My machine 1 is adapted to engage and grip the article at this point, while the mold table 5 is stationary, and to transfer it to the other side of the machine, through an arc of approximately 180° where it is deposited on a conveyer unit 9. With the arrangement shown in Figure 2, the article 8 is also inverted before being deposited on the conveyer unit. The conveyer unit, in this instance, is of a continuously moving type consisting of a plurality of longitudinally spaced spindle units carried by a continuously moving endless chain 11. Each of the spindle units 10 has a rotating article receiving cup 12 on its upper end. The conveyer unit 9 which is shown in this figure is part of a glassware glazer. However, it is to be understood that my machine is not limited in its use to association with the machines shown in Figure 2.

The general structure of my machine is illustrated best in Figures 1, 2, 3 and 4. It consists mainly of a base and supporting standard 13, a rotatable turret 14 supported on the unit 13, a plurality of radially extending circumferentially spaced article handling units 15 carried by the turret, and a cam unit 16 which controls swinging movement of the article handling units 15 on the turret to provide the "dwell" periods at the takeout and discharge positions.

Figure 14:
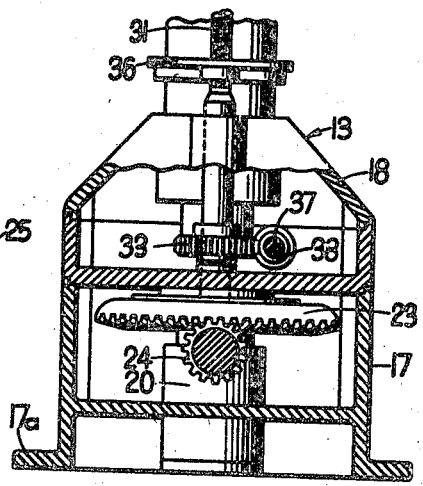
Figure 14 is a vertical sectional view taken substantially along line 14—14 of Figure 13.

The supporting base and standard unit 13 comprises a substantially cylindrical housing 17 having an inwardly tapered upper end portion 18. The housing 17 has a flange 17a on its lower end which may be bolted to a suitable support which, in the example shown in Figure 2, is the extension 2 of the base 3 of the forming machine. Centrally disposed within the housing 17 (Figure 3) is a supporting post 19 which has its reduced lower end keyed in a socket member 20 formed integral with housing 17 at the center thereof. The post 19 extends up through the top of the machine. Disposed in surrounding relationship to the post 19 is a sleeve standard 21 which extends for the greater portion of the height of the post and which has its lower end supported by a thrust bearing 22 that rests on the socket member 20. A large gear 23 is keyed to the lower end of the sleeve. This gear 23 is engaged by a driving pinion 24 (Figures 3 and 14) which is carried by a drive shaft 25 that projects into the housing 17. The shaft 25 is rotatably carried by a bearing sleeve extension 26 of the housing and is connected to a suitable source of power. The shaft 25 will be continuously driven and will rotate the sleeve 21 continuously.

Surrounding the sleeve 21 is a second sleeve 27 which has its lower end keyed in a central sleeve 28 formed in the upper portion 18 of housing 17. The sleeve 21 will be free to rotate within the sleeve 27, but rotation of the sleeve 27 relative to housing 17 is precluded. Disposed in surrounding relationship to the sleeve 27 is a third sleeve 29 which is slidably mounted on sleeve 27 but will be prevented from rotating relative thereto. It will be noted that the sleeve 27 terminates substantially midway of the height of the sleeve 21 and the upper end portion of the sleeve 29 is made of increased thickness so as to provide a shoulder 30 which will contact the upper end of sleeve 27 and will limit downward sliding movement of sleeve 29 on sleeve 27.

Figure 13:
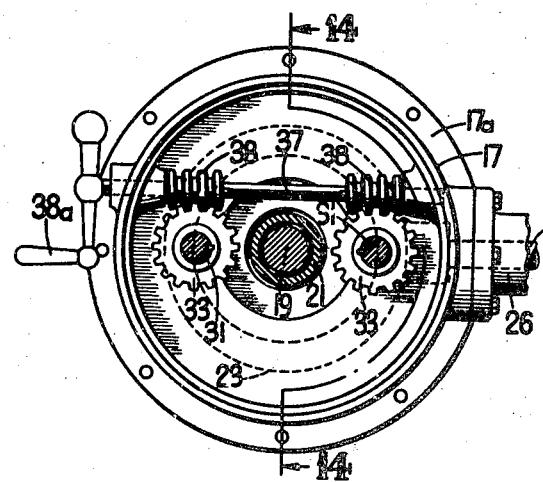
Figure 13 is a horizontal sectional view taken along line 13—13 of Figure 3 and illustrating the mechanism for raising and lowering the turret.

In order to adjust the sleeve 29 vertically, telescopically relative to the sleeve 27, I provide a pair of jackscrews 31 which are provided on opposite sides of the sleeve 29 at diametrically opposed points. Each of the jackscrews 31 is vertically disposed with its axis parallel to the axis of post 19. The lower end of each jackscrew is reduced and is rotatably supported in a bearing sleeve 32 which is carried by an inwardly extending part of the housing 17. Each jackscrew has a worm pinion 33 keyed on its lower end and which has a thrust bearing 34 associated therewith. Each jackscrew extends upwardly through the top of portion 18 of the housing and to a point substantially level with the top end of sleeve 27. The threaded upper portion of each screw 31 extends through a threaded sleeve 35 that is non-rotatably carried by a large collar 36. The collar 36 is disposed in surrounding relationship to the reduced lower end of the sleeve 29 and serves to support the sleeve. It will be apparent that when the jackscrews 31 are rotated, the collar 36 and the sleeve 29 carried thereby will be moved vertically relative to the sleeve 27, depending upon the direction of rotation of the jackscrews. The jackscrews are rotated simultaneously by means of the mechanism shown best in Figures 13 and 14. This mechanism comprises a transversely extending worm shaft 37 which is rotatably mounted in bearings carried by housing 17. This shaft has a pair of worms 38 keyed thereon which engage the worm pinions 33 keyed on the lower ends of the jackscrews. The shaft 37 may be rotated readily by means of a handle 38a which is keyed on the outwardly extending end thereof.

The turret 14 is supported for rotation with the sleeve 21. As shown best in Figures 3 and 8, the turret is provided with a centrally disposed sleeve 39 which surrounds the sleeve 21 and is splined thereto so that it can move vertically on the sleeve 21. The sleeve 39 has an integral outwardly projecting annular supporting shelf or table 40. The sleeve 39 and table 40 are supported on the upper end of the sleeve 29 by means of a thrust bearing 41 which is carried on the reduced upper end of the sleeve 29. Thus, the sleeve 39 will rotate with the sleeve 21 relative to the upper end of sleeve 29. Furthermore, it will move vertically with the sleeve 29 when such sleeve is adjusted vertically by means of the jackscrews 31.

As previously indicated, the rotatable turret 14 carries a plurality of radially extending circumferentially spaced article handling units 15. In the machine shown, I have illustrated four of these units, but it is to be understood that this number can be varied. The article handling units 15 are illustrated best in Figures 1, 3, 3a, 8, 10, 11, and 12. As previously indicated, these units are carried by the turret in such a manner that swinging movement horizontally and limited radial movement is permitted during rotation of the turret.

Each unit 15 consists of a main casting which has a flat base 42 of segmental outline. The base plate 42 (Figure 15) has a substantially straight outer edge 43, but the plate is greater than a semicircle. It is provided with a reduced guide boss 44 which rests on the upper flat surface of a casting 45 and fits within and cooperates with a segmental guide flange 46 which also extends through an arc greater than a semicircle. The flange 46 is formed integral with and projects outwardly from the casting 45. The casting 45 is rigidly secured within a segmental socket of proper complemental size and outline which is formed in the edge of the table 40. It will be apparent that the base 42 will be free to rotate within the guide flange 46.

The casting 42 has an integral horizontally disposed radially directed sleeve 47 (Figures 8 and 15) formed integral therewith and projecting upwardly therefrom. The sleeve 47 is further provided with an upstanding cylindrical extension 48 on its upper side. The sleeve 47 has mounted therein for rotating and axial movement, a tong-operating cylinder 49. The cylinder 49 tightly fits within the outer end of the sleeve and is provided with an inwardly extending integral shaft portion 50 which is carried by a bearing structure 51 disposed in the rear end of the sleeve. The rear end of the sleeve is closed by a cap 52 which carries a fluid-seal 53 that is associated with the shaft 50. The shaft 50 is provided with a fluid passageway 54 extending therethrough which communicates at its outer end with the chamber 55 within cylinder 49 and at its inner end with a chamber 56 formed within the cap 52. The upper end of the chamber 56 communicates with a passageway 57 that extends upwardly through the cylindrical extension 48 on sleeve 47. Fluid is supplied through passageway 57, chamber 56 and passageway 54 to the chamber 55 from a source to be disclosed hereinafter. The shaft 50 extends within chamber 56 a substantial distance so as to permit axial movement of cylinder 49 while still maintaining communication between the inner end of passageway 54 and the chamber 56.

For rotating the casting 42 within the flange 46, the extension 48 of the casting has the lower end of an upstanding rocker-arm 58 (Figure 15) rigidly secured thereto at the forward side thereof by means of bolts 59. The upper end of this arm 58 extends laterally and carries a cam follower which is in the form of a roller 60 mounted for rotation on a vertical axis. This roller 60 will cooperate with the cam unit 16, in a manner to be described later, for controlling swinging movement of the article handling unit 15.

Figure 15:
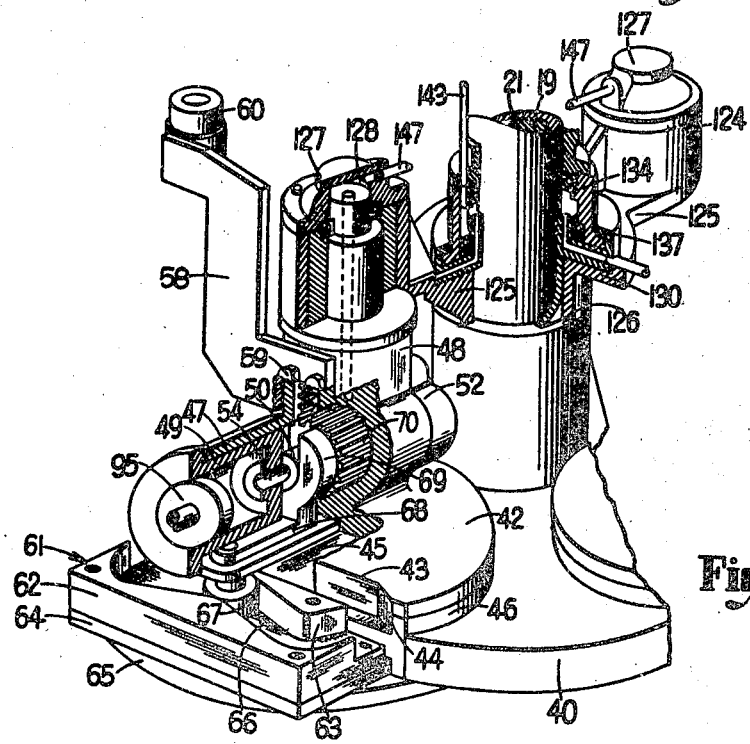
Figure 15 is a view partly in perspective and partly in section showing portions of the supporting standard, the turret and one of the article handling units carried thereby.

For producing limited radial movement of the cylinder 49 upon swinging movement of the article handling unit 15, I provide the cam structure 61 which is shown best in Figures 8 and 15. The cam structure comprises cam blocks 62 and 63 which are secured to the upper surface of a plate 64 that is secured to the top surface of a flange 65 on adjacent cylinder 78 which extends outwardly beyond the edge of table 40. The cam blocks 62 and 63 are so shaped that they cooperate to produce a cam groove 66. The cam groove has an outline of a spread V with its vertex inwardly. In other words, it has a mid-portion that is closest to the axis of plate 42 and end portions which extend outwardly farther away from such axis. Cooperating with the cam groove 66 is a follower in the form of a roller 67 mounted on a vertical axis. This roller 67 is carried on the outer end of a radially extending arm 68 which is mounted for sliding movement in a radial slot formed in the lower surface of the plate 42. The arm 68, adjacent its inner end is provided with an upstanding integral fork 69 which extends behind the cylinder 49 and which embraces the shaft 50. It will be apparent that with this structure, when the base plate 42 is rotated within guide 46 the arm 68 will be swung laterally, causing the roller 67 to move from its innermost radial position to different positions in the cam groove 66. This will move the arm 68 radially in the plate 42 and, thereby, move the cylinder 49 axially outwardly due to engagement of the fork 69 with the inner end thereof. Inward axial movement of the cylinder 47 occurs when the roller 67 moves the arm 68 inwardly, due to engagement of the fork 69 with the forward end of a pinion 70 which is formed integral with the shaft 50.

As previously indicated, it sometimes is desirable to invert the article during rotation of the turret. The pinion 70 forms a part of this inverting mechanism. The pinion 70 is elongated and is disposed within the sleeve 47 for radial movement with the cylinder 49 with which it is integrally formed. The mechanism for rotating the pinion 70 is illustrated best in Figures 10, 11 and 12. As shown in Figure 10, one side of the sleeve 47 is provided with a vertical slot 71 in which a rack-bar 72 is mounted for vertical movement. This rack-bar 72 engages the pinion 70 and passes through an opening 73 formed in the base plate 42 and through a central opening 74 formed in the casting 45. This opening 74 serves as an additional centering and pivoting means for the plate 42 and cooperates with a downwardly extending annular guide flange 75 formed integral with plate 42.

The lower end of the rack-bar 72 is provided with a horizontal extension 76 which carries a downwardly extending pivot pin 77 that is disposed co-axial with cylinder 78 into which the lower end of the rack-bar extends. This cylinder 78 has a flange 65 on its upper end which is bolted by means of bolts 80 to the lower surface of casting 45. The casting 45 is provided with a centering shoulder 81 for cooperating with a recess in the upper end of cylinder 78 to center it co-axial with the opening 74. The pivot pin 77 on the lower end of the rack-bar extends into a ball bearing 82 carried in the upper end of a piston 83. Thus, the rack-bar will be rotatably connected to the piston. The piston includes a depending guide sleeve 84 which extends through a central opening in the bottom of the cylinder 78. The lower end of this sleeve 84 has a cross-shaped slide member 85 which slides vertically in a cross-shaped guide slot 86 that is vertically disposed, and is formed in a member 87 which has its upper end attached to the lower end of the cylinder 78. One of the horizontal arms of the slide member 85 carries a cam follower which is in the form of a roller 88 supported for rotation on a horizontal axis. This roller rests on a cam track 89 (Figure 3) which extends helically around the sleeve 29. The cam 89 is supported on the sleeve 29 rigidly by means of a sleeve 90 which has its lower end resting on a shoulder 91 of the sleeve 29. The sleeve 90 is prevented from rotating on the sleeve 29 by being keyed thereto. The jackscrews 31 extend loosely through openings formed in the cam so that the cam may move vertically with the sleeve 29 when it is adjusted.

It will be apparent that with this rack and pinion structure, when the turret rotates, the roller 88 of each of the article handling units will travel on the inclined cam 89. This will produce a vertical movement of the cross-shaped guide 85 in the slot 86. However, this structure will prevent swinging movement of the member 85 about the axis of member 84. Thus, there will be no danger of misplacement of roller 88 from the cam track 89. The piston 83 will also be moved vertically, thereby causing the corresponding vertical movement of the rack-bar 74. This, in turn, will cause rotation of the pinion 70, and, consequently, of the shaft 50. Downward movement of rack-bar 72 will be insured by a top section 89a on the cam track 89, which is parallel to the bottom section and extends part way around the sleeve 29, which engages the top side of rollers 88. If it is desired not to use the tong rotating structure, the rollers 88 may be removed from the various units, or such structure may be rendered inoperative in any other suitable manner. The rack and gear structure will not interfere with rotation of plate 42 relative to casting 45 due to the fact that the rackbar is pivotally connected to the piston 83 by the pivot 77. Also, radial movement of the shaft 50 will be permitted without interfering with the intermeshing re'ationship of rack-bar 72 and pinion 70, due to the fact that such pinion is elongated.

Each cylinder 49 carries an article gripping tong structure. This structure is illustrated best in Figures 1, 3, 8 and 9. The tong structure is carried by a plate 92 which is bolted to a peripheral flange 93 on the outer end of the cylinder 49. This plate 92 has a central opening in which a piston rod 94 is slidably mounted. The inner end of the rod 94 has a piston 95 clamped thereon and which operates within the cylinder 49. The plate 92 is provided with an outwardly directed extension 96 and the outer portion of this extension carries a pair of cooperating tong jaw carrying members which are in the form of bellcrank levers 97. These bellcrank levers 97 are pivoted, as at 98, for swinging movement in a horizontal plane towards and away from each other. The outer end of each member 97 carries an article engaging tong jaw 99 which is fastened to member 97 by means of bolts, one of which has a cushion spring 100 associated therewith to permit firm grasping of the glass article without injury thereto. The inwardly extending arms 101 of the bellcrank levers are forked to receive blocks 102 which are carried by a pin 103. The pin 103 is fixed in the outer end of the rod 94 and the blocks 102 are rotatably carried thereby. The pin 103 extends on opposite sides of the rod 94 and its opposite ends are attached to a pair of tension springs 104. The inner ends of the springs 104 are attached to anchor pins 105 which are disposed at diametrically opposed points on the plate 92. The rod 94 is provided with a guide portion 106 which slidably fits within a guide slot 107 formed in the outwardly projecting portion 96 on the plate 92.

The tongs will function as follows: Air supplied into the chamber 55 will control movement of the piston 95. The tongs will be spread apart, as shown in Figure 9, when the piston 95 is in its outermost position as shown in Figure 8, due to the fact that the rod 94 will push the pin 103 outwardly causing the blocks 102 to engage the bellcrank levers and swing them outwardly about pivots 98 away from each other. When the piston 49 returns to its original position, due to the venting of chamber 55 and the action of springs 104, the pin 103 and the blocks 102 carried thereby will move inwardly, swinging the article gripping jaws 99 towards each other. Thus, air pressure will serve to spread the jaws apart while spring pressure will serve to move them together into article gripping position.

Figure 1:
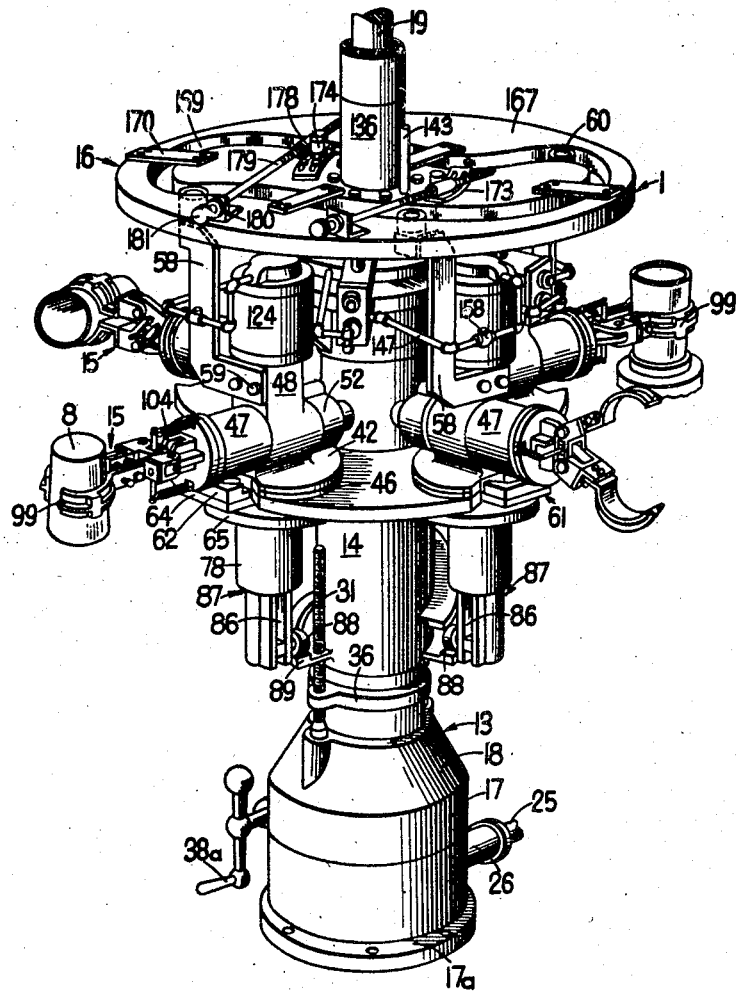
Figure 1 is a perspective view of a machine constructed in accordance with my invention.

With the tong units just described, the article will be gripped when it is in a vertical position as shown in Figure 1. If the machine is provided with the rack and pinion inverting mechanism, the article will be inverted during rotation of the turret. However, it sometimes happens that it is desirable to provide a tong structure which will always be vertically disposed and will grip the article from above and hold it in a pendant position without inverting it during the rotation of the turret. For this purpose, the tong structure just described can be replaced with a tong structure of the type disclosed in Figures 19 to 22. To remove the original tongs unit, it is merely necessary to disconnect the plate 92 from the cylinder 49 and to pull the piston 95 out of the cylinder.

The tong structure shown in Figures 19 to 22 comprises a vertically disposed cylinder 108 which has an extension 109 thereon that is provided with a flange 110 which may be bolted to the flange 93 of cylinder 49. The cylinder 108 has a vertically movable piston 111 slidably mounted therein and this piston has a depending hollow piston rod or sleeve 112. A tong supporting member 113 is secured to the lower end of the cylinder 108 and serves to close said cylinder. The rod 112 slides in an opening provided in this member 113 centrally of the cylinder. The member 113 is provided with a pair of depending guide arms 114 which have the vertically extending guide slots 115 formed therein. These slots 115 receive the ends of a guide and pivot pin 116. Pivotally supported on the pin 116 in an X arrangement are a pair of tong jaw carrying levers 117. The outer ends of these levers carry the article engaging jaw members 118. The opposite ends of the levers are bifurcated and receive transverse pins 119 which are carried on opposite ends of a cross-arm 120. The cross-arm 120 is carried by the lower end of the piston rod 112. A compression spring 121 is disposed within the sleeve 112 and has its lower end engaging a block member 122 which is mounted for vertical sliding movement in the cross-arm 120. The pin 116 extends through a vertical slot 123 in the cross-arm 120.

Figure 19:
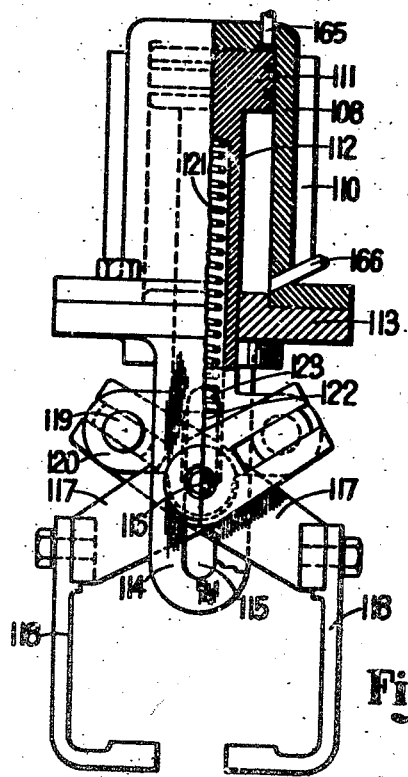
Figure 19 is a view mainly in side elevation, but partly in section, showing a different type of tongs which are adapted to be vertically disposed on the turret.
Figure 20:
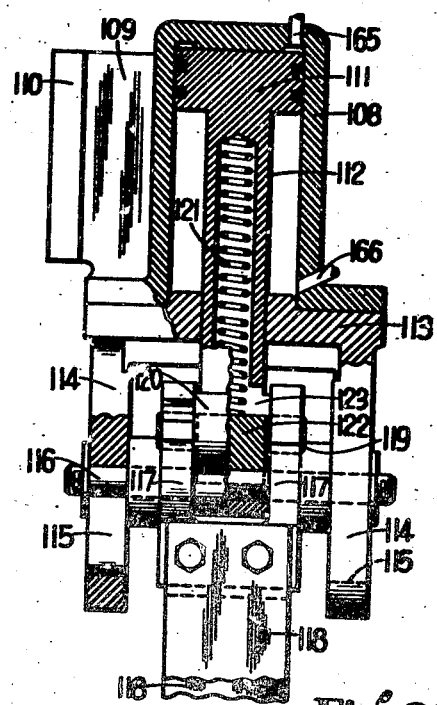
Figure 20 is a side elevational view, partly broken away, taken at right angles to that of Figure 19.
Figure 21:
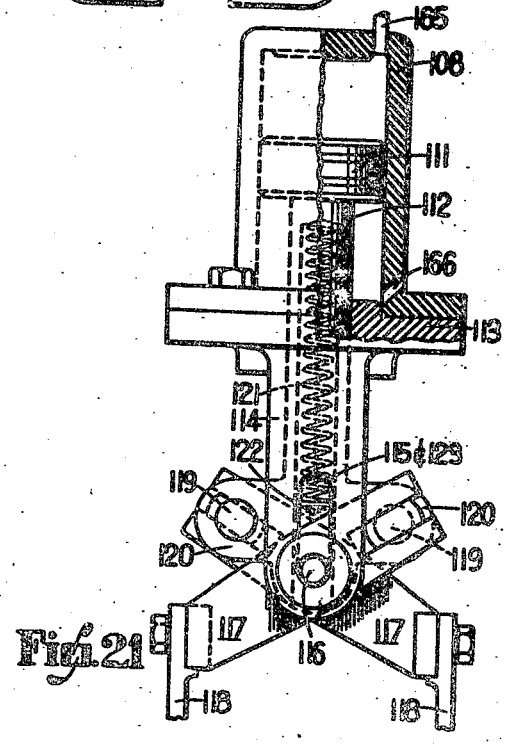
Figure 21 is a view similar to Figure 19 but showing the tongs and their operating mechanism in partially opened positions.
Figure 22:
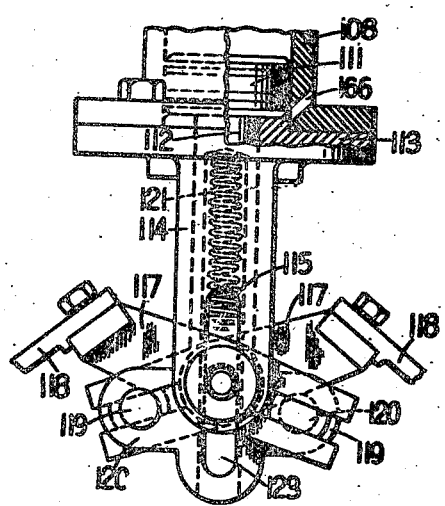
Figure 22 is a view similar to Figure 21 but showing the tongs and associated mechanism in completely opened position.

With the piston 111 in its uppermost position indicated in Figure 19, the cross-arm 120 will be in its uppermost position. At this time, the spring 121 will be compressed and will serve to force the pin 116 into the bottom end of the slot 123 in the cross-arm 120. However, the pin 116 will be in the upper ends of the vertical slots 115 in arms 114. When air is supplied to the cylinder 108 to move the piston 111 downwardly, the rod 112 is moved downwardly, but there is no separation of the jaws 118 until the pin 116 strikes the lower ends of the slots 115, since the pin 116 will still be maintained at the lower end of slot 123 by the spring 121. However, as soon as the pin 116 reaches the lower ends of slots 115, the cross-arm 120 will continue to move downwardly relative to the arms 114 and, therefore, the pin 116 will move into the upper end of the slot 123 in the cross head, as shown in Figures 21 and 22. Downward movement of the cross head relative to the pin 116 will swing the jaws 118 away from each other, due to the fact that the bifurcated ends of the levers 117 will be swung downwardly around the pivot 116. The control of air supplied to the cylinder 108 may be accomplished by mechanism to be described later.

The air system for controlling operation of the tong units of the various article handling units 15 will now be described. This system is illustrated best in Figures 3, 3a, 8, 17 and 18.

The upper end of each of the cylindrical extensions 48 of sleeve 47 (Figures 3, 8 and 17) is reduced and fits tightly within a collar 124. The collars 124 are carried by an annular support 125 which surrounds the sleeve 39 and which rests on a shoulder 126 formed on the sleeve. The member 125 is keyed to the sleeve 39 and is adapted to move vertically therewith. A cap 127 is provided on top of the collar 124 and is suitably bolted thereto. This cap has a chamber 128 formed therein with which the passageway 57 in extension 48 communicates. The upper reduced end of member 48 is rotatable within the collar 124 so as not to interfere with swinging of unit 15. Within the cap 127 a fluid-tight seal 129 is provided in association with the upper further reduced extremity of member 48 in such a manner as to permit this rotation without leakage from chamber 128. Resting on the upper surface of member 125 and being rotatable therewith is a disk-like member 130 which surrounds the sleeve 21 and which also rests on the upper end of the sleeve 39. The member 130 is splined to the shaft 21 so that it will rotate therewith but will be free to move vertically with the sleeve 39. The member 130 has a plurality of radially extending air supply passageways 131, one being provided for each of the units 15. The inner ends of each of these passageways 131 communicates with a vertical passageway 132 which has its upper end connected to an annular chamber 133. This chamber is formed by the cooperation of a collar 134 with the upstanding sleeve 135 formed on member 130. The member 134 is attached by bolts to a non-rotatable bearing sleeve 136 (Figure 3) which is splined on the upper end of post 19 for vertical movement and which rotatably receives the upper end of the sleeve 21. A ring 137 is bolted to the annular shoulder 138 on the outer edge of member 130 and overlaps a peripheral flange 139 on the lower edge of collar 134. Thus, the member 130 may rotate relative to the stationary member 134. To permit this rotation without leakage of fluid from chamber 133, an annular fluid-tight seal 140 is provided between the lower part of member 134 and the central part of member 130 and a similar seal 141 is provided between the upper part of member 134 and the upper end of the sleeve 35 of member 130. A vertical passageway 142 formed in member 134 supplies air to the chamber 133. A conduit 143 (Figure 3) is connected to a suitable source of air pressure and is connected to the upper end of passageway 142.

Each of the air supply passageways 131 in member 130 is connected by means of a line 144 to a control valve 145 carried by brackets 146 (Figure 17) which are secured to the member 125. The control valve 145 is, in turn, connected by a line 147 to the chamber 128 at the top of the extension 48 of the member 47. The control valve 145 includes the supply chamber 148 connected to line 144 and to line 147. It also includes an exhaust chamber 149 which is vented to the atmosphere by a vent 150. A poppet valve 151 is slidably mounted in the valve casing and has a head 152 which will cooperate with a seat 153 that is disposed between lines 144 and 147. Movement of the valve 151 is controlled by a vertically disposed pin 154 which is rotatably carried by the brackets 146. A starwheel 155 is keyed to the upper end of this pin 154 and is adapted to be rotated by suitable trigger mechanism to be disclosed hereinafter. Adjacent the end of the valve stem the pin 154 is provided with notches 156 on its opposite sides.

Figure 17:
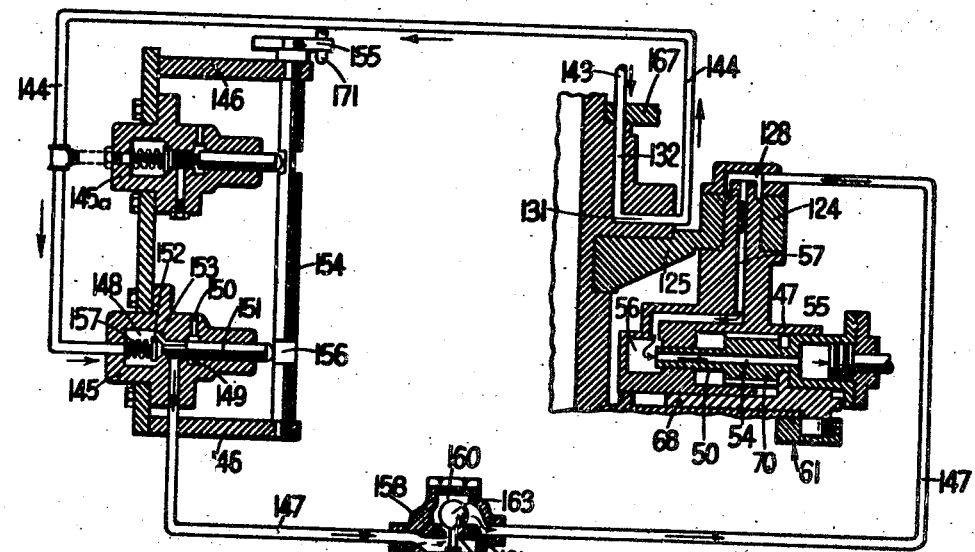
Figure 17 is a diagrammatic view, mainly in section, illustrating the air control mechanism for operating the tongs of the article handling units.
Figure 18:
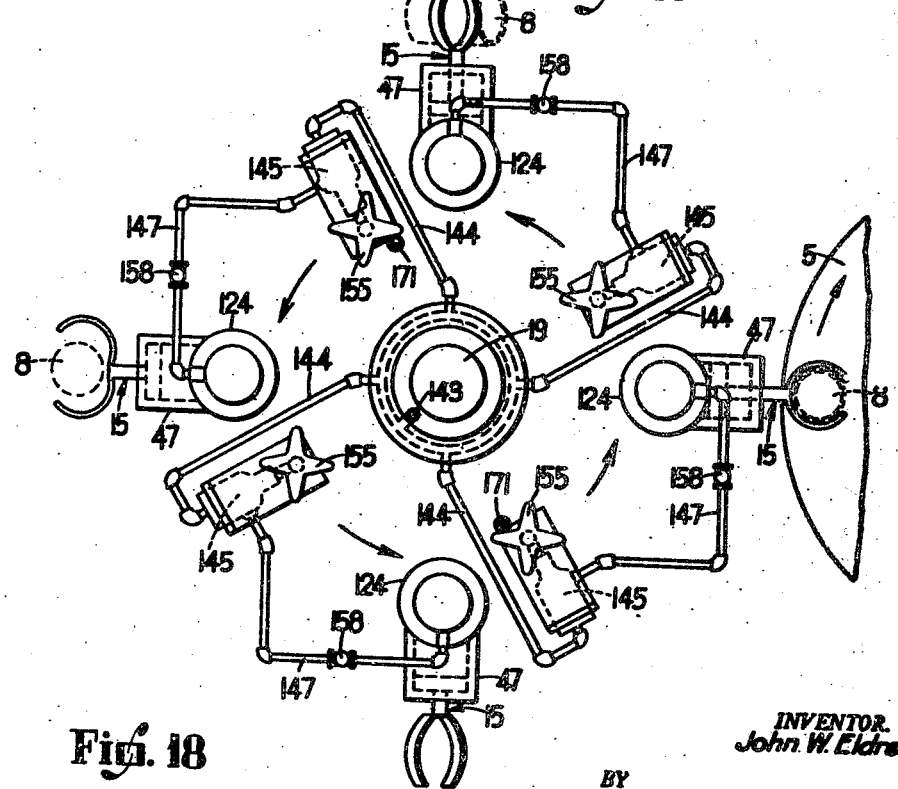
Figure 18 is a diagrammatic plan view of the mechanism for controlling the supply of air for operation of the tong units.

Normally, as shown in Figure 17, the valve 145 is open due to the fact that the end of the stem is in engagement with the periphery of the pin 154 and does not extend into the notches 156. At this time, air will flow from line 144, through chamber 145, around the valve 152 and the adjacent reduced part of the stem, into line 147 and from the line 147 into the chamber 128. Flow of air to the discharge chamber will be prevented by the large part of the valve stem. From the chamber 128, it will flow through the passageway 57, through chamber 56, through passageway 54, into the chamber 55 where it will force the tong operating piston 95 outwardly. This will open the tongs. When the pin 154 is rotated so that the outer end of the stem of valve 151 is forced by the compression spring 157, disposed within chamber 148 and in engagement with the head 152, into one of the notches 156, the valve head 152 will be seated on the valve seat 153. This will interrupt flow of air from the line 144 to the line 147. However, air from line 147 will vent from the line through the valve, around the reduced part of the valve stem into chamber 149, and then through the vent 150 to the atmosphere.

In order to cushion the closing movement of the tongs which is produced by springs 104 when the cylinder chamber 55 is vented as described above, I provide a regulating valve 158 in the line 147. This valve includes chambers 159 and 160 separated by a wall upon which is formed a valve seat 161 in association with an opening 162 extending therethrough. A ball valve 163 is disposed in chamber 160 for cooperation with the ball valve seat 161. Air under pressure flowing from valve 145 through line 147 will unseat the ball valve 163. Air exhausted from cylinder chamber 55 through line 147 will tend to seat the ball valve 163. However, to prevent seating of the valve a setscrew 164 is threaded through the bottom of the valve up through the chamber 159 and through the opening 162 so that it will engage the ball. The amount of air returning back past the valve 163 can thus be regulated. The screw 164 may be adjusted to such an extent that the tongs will move together slowly into gripping relationship to the article so as to prevent injury to the article.

It will be apparent that to operate the tong unit disclosed in Figures 19 to 22, a valve must be provided for controlling the supply of air to and exhaust of air from each end of the cylinder. One air line 165 (Figure 19) will be connected to the top of the cylinder while another air line 166 will be connected to the bottom of the cylinder. One of these lines, preferably the line 165, will be connected to the control valve 145. The other of the lines 166 will be connected to a control valve 145a (Figure 17) which is a duplicate of the valve 145 and which will also be connected to line 144 as indicated by the dotted lines in Figure 17. Thus, air will be supplied to and exhausted from each end of cylinder 108. Furthermore, the closing movement of the tongs will be cushioned by the valve 158.

The cam unit 16 for controlling swinging movements of each of the units 15 on the turret 14 is illustrated best in Figures 1, 3, 4 and 16. This unit comprises a large stationary cam disk 167 which is greater in diameter than the table 40. This disk 167 is non-rotatably supported by the sleeve 136, it being provided with a central opening so that it can be slipped downwardly over the sleeve 136 into engagement with a flange 168 carried on the lower end of the sleeve and upon which it rests. A cam groove 169 is formed in the disk and is adapted to receive and guide the rollers 60 carried on the rocker-arms 58 of the units 15. The cam groove 169 is continuous and it is therefore necessary to provide the cleats 170 which are fastened to the inner and outer sections of the cam disk and maintain them in proper relationship. The cam groove 169 is of an outline which will be discussed more specifically hereinafter.

Carried by the cam plate 167 is a pair of triggers 171 (Figure 4) which are adapted to engage and rotate the starwheels 155 carried by the upper ends of the pins 154. The trigger mechanism is illustrated best in Figures 1 to 7 inclusive. Each of the triggers 171 is in the form of a vertically disposed pin which is mounted for adjustment in an arcuate slot 172 formed in the cam disk 167. The slots 172 are concentric with the cam disk. The pin 171 is clamped to an arcuate plate 173 (Figure 7) by means of a clamping knob 174 which is threaded on the reduced upper end of pin 171 that passes through an opening in the plate 173. The plate 173 is provided with a pair of arcuate slots 175 at its edges which are concentric with the slot 172 (Figure 5). Guiding bolts 176 extend through the slots 175 and are adapted to be positioned in any of the openings 177 formed in the cam plate in arcuate rows of spaced openings, the rows being directly beneath the slot 175. The knob member 174 has a horizontally disposed sleeve 178 secured thereto. This sleeve 178 has a screw 179 threaded therethrough. The screw 179 is rotatably carried by a bracket 180 in such a manner that axial movement thereof is precluded. The bracket 180 is carried by the cam disk on its upper surface. The screw 179 may be rotated by means of a knurled knob 181.

It will be apparent that if the screw 179 is rotated, the plate 173 will be shifted about the axis of the cam disk. Binding of the screw 179 in the sleeve 178 will be precluded due to the fact that the bracket 180 is attached to the cam disk by a vertical pivot 182. The bolt 176 will guide movement of the plate and the pin 171 will be shifted to different positions along the slot 172. For greater adjustments of the pin 171, it may be desirable to move the bolts 176 to a different pair of openings 177.

Figure 16:
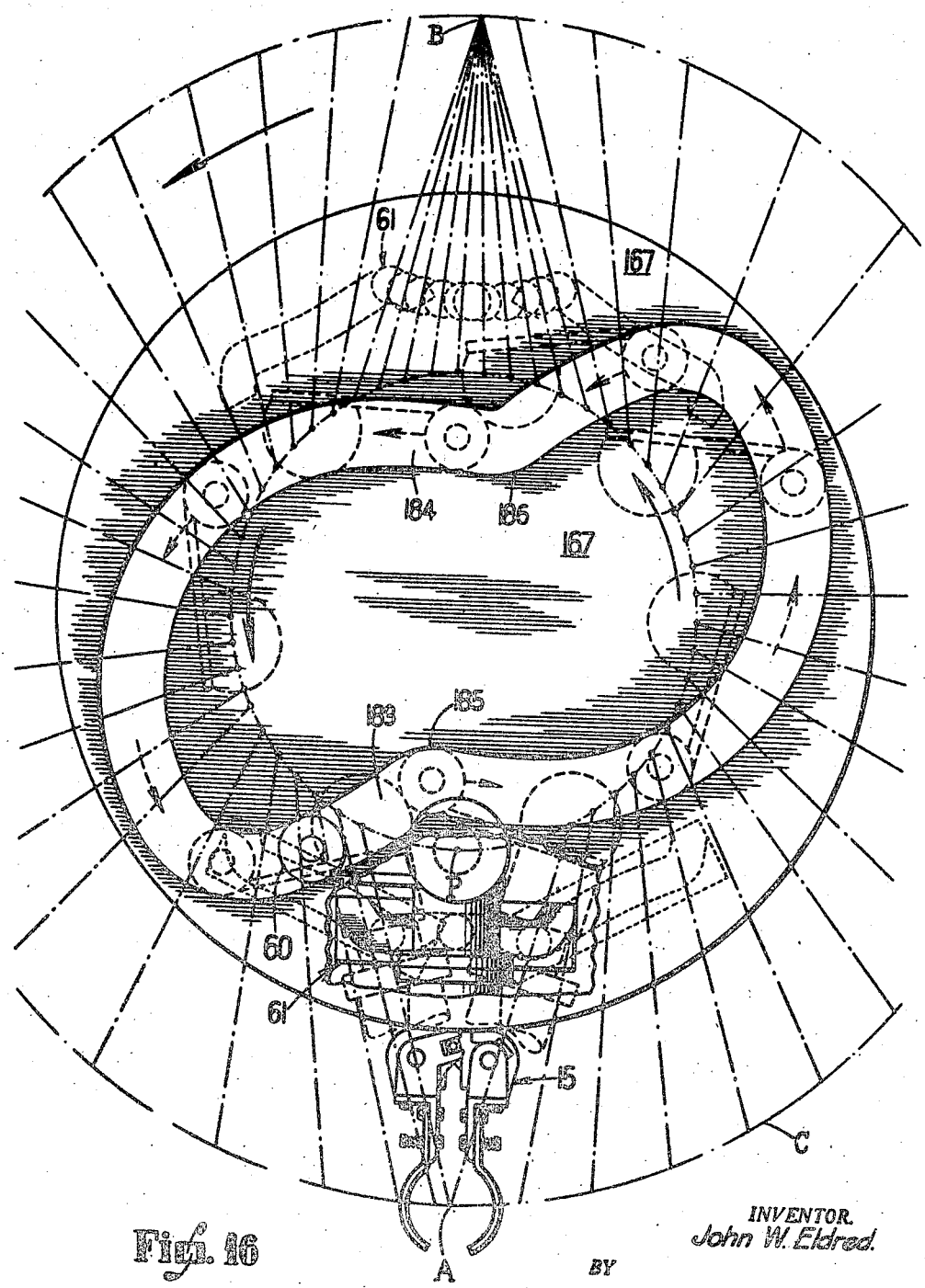
Figure 16 is a diagrammatic plan view illustrating the operation of the cam mechanism which controls swinging movements of the article handling units, during rotation of the turret, to provide the "dwell" periods at the article engaging and article discharging positions.

The shape of the cam groove 169 is illustrated best in Figure 16. As previously indicated, it is desirable to swing the units 15 about their pivot axes P during rotation of the turret 14. The rocker-arms 58 of the units 15 extend substantially at right angles to the radial axes of the units 15. The turret 14 will rotate and since the cam disk 167 will remain stationary, the rollers 60 operating in the cam groove 169 will swing the units 15 horizontally about their pivot axes P.

The cam groove 169 is so shaped that a dwell period will be provided at the point A, corresponding to the article takeout station, and a dwell period will be provided at the point B, corresponding to the article discharge position, as indicated diagrammatically in Figure 16. In other words, although the turret is continuously rotated, the outer ends of the units 15, which carry the tongs, will remain substantially stationary for a short period at the points A and B. This is accomplished by having the cam groove 169 of the outline shown in Figure 16. The cam groove 169 is in the form substantially of a distorted ellipse. On opposite sides of the major axis of this ellipse, there is provided re-entrant sections 183 and 184. The innermost point 185 on the section 183 is slightly behind the point A, assuming the turret to be rotating in a counterclockwise direction. Also the innermost point 186 of section 184 is slightly behind the discharge point B. Furthermore, the points 185 and 186 are on opposite sides of the minor axis of the ellipse.

As the turret 14 rotates relative to the cam disk 167, the roller 60 of each unit 15 will travel in the cam groove 169. At the ends of the elliptical cam groove there will be some swinging of the units 15 about their pivot axes P due to the fact that the end sections are not concentric with the axis of the turret, but this movement will only be minor. However, as the roller 60 of each unit 15 moves into the re-entrant cam section 183, movement of the inner end of the unit 15 is retarded relative to the outer end. In other words, the tongs will reach the takeout point A before the roller 60 reaches the innermost point 185 of this section of the cam. As soon as the roller 60 passes beyond the innermost point 185, the inner end of the unit 15 will travel ahead of the tongs or outer end of the unit. In other words, roller 60 will pass beyond the point 185 while the tongs will remain substantially stationary. However, as the roller 60 moves out of the re-entrant section 183, the outer end of the unit 15 will begin to move up into radial alignment with the roller. As the unit 15 approaches the discharge point B, the same action will take place in connection with the re-entrant cam section 184. In other words, during a complete rotation of the turret, each unit 15 will approach the article engaging position A where the outer end of the unit, or the tongs, will first be advanced relative to the inner end and then retarded relative to the inner end, so that the tongs will remain substantially stationary during the time they are operated to engage the article. Then, before the complete rotation of the turret occurs, the unit 15 will approach the article discharging position B where the outer end of the unit, or the tongs, will first be advanced relative to the inner end and then retarded relative to the inner end, so that the tongs will remain substantially stationary during the time they are opened to release the article.

It will be apparent that due to the provision of the reentrant sections 183 and 184 of the cam groove, it will be necessary for the units 15 to be radially extensible, since it is also desirable that the center c of each of the tong structures will always move along a true circle C, as shown in Figure 16. For this purpose, the cam groove 66 and cooperating roller 67 on each of the units 15 is provided. This arrangement is such that as the roller 60 enters into either of the re-entrant sections 183 or 184, the roller 67 will be moved into one of the outwardly extending end sections of the cam groove 66. This will increase the distance between the center c of the tong structure and the pivot axis P of the unit 15 and, consequently, will maintain the center c on the circle C. As the roller 60 passes the innermost point 185 or 186 of the re-entrant cam section, the roller 67 will move into the other outwardly extending end of the cam 66. When the unit 15 is in exact radial position, the roller 67 will be at the mid-point or innermost point of the cam groove 66.

Rotation of the turret also will close and open the tongs as previously indicated. The tongs will close and engage the ware at the point A and will open and release the ware at the point B. The proper timing of these actions is accomplished by accurately positioning the trigger pins 171. One of the pins 171 will engage the starwheel 155 of one of the units 15 as the tongs thereof reach the article engaging position A and will, therefore, cause the air to exhaust from the tong cylinder 49 to permit closing of the tongs. It will be understood that, as previously indicated, the star-wheels move along with the turret while the triggers 171 remain stationary with the cam disk 167. The other of the pins 171 will engage the star-wheel of such unit 15, as the tongs thereof reach the article releasing position B and will, therefore, supply air to the tong cylinder 49 to open such tongs.

The operation of the entire machine will be apparent from the above description. As the turret rotates, the tongs of the successive units 15 will dwell at the article takeout position above a mold 6 on the forming table, will be actuated to grip the article 8 while the mold table is stationary, and will then swing around with the turret until the discharge station B is reached. At this station, the article gripping tongs of such unit 15 will dwell over the conveyer unit 9 and the article will be released therefrom at the instant a cup moves therebeneath to receive it. Then the tongs will swing around again to the takeout position. During the rotation of the turret, the tongs will be rotated around the radial axis of the unit 15, if the inverting mechanism is employed. The turret and associated units may be adjusted vertically in accordance with the level of the forming machine and the size of the articles.

It will be apparent from the above description that I have provided a continuously operating article transferring machine which will be exceptionally smooth in operation and will handle glassware with a minimum of breakage and distortion of the ware. This machine is particularly useful with an intermittent forming machine although it is not limited thereto. The machine may be of a light and compact construction due to its smooth operating nature. Although it is of simple construction it will have a greatly increased capacity over prior art machines of the intermittent type. With this machine, the articles are engaged without fail at the takeout position and are deposited on the conveyer without danger of missing the article receiving member on the conveyer or without danger of the ware toppling over on a ware supporting surface of the conveyer. Although my machine is continuous in operation, it has certain advantages common to intermittent machines, but without the disadvantages of such machines.

Other advantages will be apparent from the preceding description and the drawings.

Having thus described my invention what I claim is:

1. Apparatus for handling articles comprising a movable support, means for continuously moving such support, an article handling unit carried by said support, said unit being pivoted intermediate its ends to said support, an article engaging member on one end of said unit, said unit being extensible to vary the distance of said article engaging member from the pivot point of said unit, means for swinging said unit on said support about its pivot during the continuous movement of said support to cause the end of said unit which carries said article engaging member to stop at a selected station while the opposite end of said unit continues to move along with said support, and means for extending said unit in timed relationship to said swinging movements to cause the article engaging member to move along a selected path relative to said continuously moving support regardless of the swinging movements of said unit.

2. Apparatus according to claim 1 wherein said swinging means comprises a stationary cam structure supported in association with said movable support and a cam follower carried by said unit and engaging said cam structure, and wherein said unit extending means comprises a cam structure immovably carried by said support and a cam follower carried by the unit at one side of the pivot point thereof and engaging said cam structure.

3. Apparatus for handling articles comprising a rotatable support, means for continuously rotating such support, a radially extending article handling unit carried by said support, said unit being pivoted intermediate its ends to said support, an article engaging member on the outer end of said unit, said unit being extensible to vary the distance of said article engaging member from the pivot point of said unit, means for swinging said unit on said support about its pivot during the continuous rotation of said support to cause the outer end of said unit to first advance relative to the inner end of said unit and then to be retarded relative to the inner end of said unit thereby causing the article engaging member to stop for a period during the continuous rotation of said support, and means for extending said unit in timed relationship to said swinging movements to cause the article engaging member to move along a selected circular path relative to said continuously moving support regardless of the swinging movements of said unit.

4. Apparatus according to claim 3 wherein said swinging means comprises a stationary cam structure supported in association with said rotatable support and a cam follower carried by said unit and engaging said cam structure, and wherein said unit extending means comprises a cam structure immovably carried by said support and a cam follower carried by the unit at one side of the pivot point thereof and engaging said cam structure.

5. Apparatus for handling glassware comprising a supporting standard, a turret rotatably mounted on such standard, means for continuously rotating said turret, a plurality of circumferentially spaced radially extending article handling units carried by said turret, each of said units being pivoted intermediate its ends to said turret, an article engaging member on the outer end of said unit, said member being mounted for movement radially of said unit, means located at plurality of stations around said turret for swinging each of said units about its pivot during the continuous rotation of said turret to cause the article engaging member to first advance relative to the inner end of said unit and then to be retarded relative to the inner end of said unit thereby causing said member to stop for a period during the continuous rotation of said support, and means for moving said article engaging member of each unit radially of the unit in timed relationship to the swinging movement of said unit to cause the article engaging member to move along a selected circular path concentric with said standard regardless of the swinging movement of said unit.

6. Apparatus according to claim 5 wherein said swinging means comprises a cam track structure supported non-rotatably by said standard in association with said rotating turret, a rocker-arm carried by each of said units adjacent its inner end, a cam follower carried by each of said rocker-arms and cooperating with said cam track, and wherein said means for moving said article engaging member of each unit radially comprises a cam track immovably carried by the turret adjacent the outer end of said unit and a cam follower carried by the unit at the outer end thereof and cooperating with said cam track.

7. Apparatus for handling glassware comprising a supporting standard, a turret rotatably mounted on said standard, means for continuously rotating said turret, a plurality of circumferentially spaced radially extending article handling units carried by said turret, each of said units being pivoted intermediate its ends on said turret, an article engaging member on the outer end of said unit, said member being supported for movement radially of said unit, means located at a predetermined station around said turret for swinging each of said units about its pivot during the continuous rotation of said turret to cause the article engaging member to first advance relative to the inner end of said unit and then to be retarded relative to the inner end of said unit thereby causing said member to stop for a period during the continuous rotation of said support, said means comprising a cam disk supported by the standard above the turret non-rotatably relative thereto and having a cam track formed therein, a rocker-arm carried by each of said units adjacent the inner end of the unit and extending upwardly into association with said track, said arm carrying a cam follower which operates in said track, means for moving said article engaging member of each unit radially of the unit in timed relationship to the swinging movement of said unit to cause the article engaging member to move along a selected circular path concentric with said standard regardless of the swinging movements of said unit, said means comprising a cam track immovably carried by the turret adjacent the outer end of said unit, and a cam follower carried by the unit at the outer end thereof and cooperating with said cam track.

8. Apparatus according to claim 7 wherein the cam track in said disk is of substantially elliptical form but has a re-entrant section which produces the swinging movements of said units and wherein said cam track for moving the article engaging member radially is of substantially V-form with its vertex inwardly.

9. Apparatus according to claim 7 wherein said turret and said cam disk are carried by said standard for vertical adjustment, and means is provided for adjusting said turret and said disk vertically.

10. Apparatus according to claim 7 wherein the article engaging member comprises article gripping tongs, each of said units including a cylinder and piston for operating said tongs, and means for controlling the supply of fluid to said cylinder in timed relationship to the rotation of said turret.

11. Apparatus according to claim 7 wherein the article engaging member comprises article gripping tongs, and means is provided in association with each of said units for rotating the tongs about the radial axis of the unit during rotation of the turret to invert the article carried by the tongs.

12. Apparatus according to claim 7 wherein the article engaging member comprises article gripping tongs, each of said units including a cylinder and piston for operating said tongs, means for controlling the supply of fluid to said cylinder in timed relationship to the rotation of said turret and means in association with each of said units for rotating the tongs about the radial axis of the unit during rotation of the turret to invert the article carried by the tongs.

13. Apparatus according to claim 7 wherein the article engaging member comprises article gripping tongs, said tongs being carried by a shaft projecting radially from said unit, means for rotating said shaft during rotation of the turret to invert the article carried by the tongs, said means comprising a rack and pinion structure associated with each of said units, means for actuating said structure during rotation of the turret, said means comprising a stationary cam track carried by the standard non-rotatably relative to the turret, and a cam follower connected to the rack and engaging said cam track.

14. Apparatus according to claim 7 wherein said turret and said cam disk are carried on sleeves mounted on said standard for vertical movement, means for adjusting said turret and said disk simultaneously vertically, said means comprising a plurality of jackscrews associated with said standard and connected to said sleeves, and means for rotating said jackscrews simultaneously.

JOHN W. ELDRED.

REFERENCES CITED

The following references are of record in the file of this patent:

UNITED STATES PATENTS

| Number | Name | Date |
|---|---|---|
| 940,165 | Koenig | Nov. 16, 1909 |
| 1,461,222 | Myers | July 10, 1923 |
| 1,654,091 | Peiler | Dec. 27, 1927 |
| 2,359,432 | McNamara | Oct. 3, 1944 |